(12) United States Patent
O'Phelan et al.

(10) Patent No.: US 6,881,232 B2
(45) Date of Patent: Apr. 19, 2005

(54) ELECTROLYTIC CAPACITOR AND MULTI-ANODIC ATTACHMENT

(75) Inventors: Michael J. O'Phelan, Oakdale, MN (US); Robert R. Tong, Fridley, MN (US); James M. Poplett, Golden Valley, MN (US); Luke J. Christenson, White Bear Lake, MN (US); Alexander Gordon Barr, Burnsville, MN (US); Brian V. Waytashek, Lino Lakes, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 0 days.

(21) Appl. No.: 10/617,279

(22) Filed: Jul. 10, 2003

(65) Prior Publication Data

US 2004/0105212 A1 Jun. 3, 2004

Related U.S. Application Data

(62) Division of application No. 09/884,864, filed on Jun. 19, 2001, now Pat. No. 6,597,564, which is a continuation of application No. 09/063,692, filed on Apr. 21, 1998, now Pat. No. 6,249,423.

(51) Int. Cl.[7] .......................... H01G 9/00; H01G 9/10
(52) U.S. Cl. .................................. 29/25.03; 361/520
(58) Field of Search ......................... 29/25.01–25.03; 361/508, 511, 528, 530

(56) References Cited

U.S. PATENT DOCUMENTS

| | | | |
|---|---|---|---|
| 3,398,333 A | 8/1968 | Zeppieri | 317/230 |
| 3,555,369 A | 1/1971 | Yoshino et al. | 317/230 |
| 3,654,523 A | 4/1972 | Markarian et al. | |

(Continued)

FOREIGN PATENT DOCUMENTS

| | | | |
|---|---|---|---|
| EP | 0753868 | 1/1997 | H01G/9/012 |
| EP | 0851446 | 7/1998 | H01G/9/055 |
| WO | WO-99/51301 | 10/1999 | A61N/1/375 |
| WO | WO-99/51302 | 10/1999 | A61N/1/375 |
| WO | WO-99/51303 | 10/1999 | A61N/1/39 |
| WO | WO-99/66985 | 12/1999 | A61N/1/39 |

OTHER PUBLICATIONS

Patent Abstracts of Japan, 15 (40), Publication No. 02276222 (U. Noriki),(Nov. 13, 1990),1 p.
Patent Abstracts of Japan, 16 (291), Publication No. 04074409 (A. Akiyoshi),(Jul. 16, 1990),1 p.
Patent Abstracts of Japan, 1996 (6), Publication No. 08055762 (E. Akira),(Feb. 27, 1996),1 p.
Database WPI Abstract, XP–002126511, An– 1997–031410 (03), Publication No. JP 08293430, Derwent Publications Ltd., London, GB,(Nov. 5, 1996),1 p.

(Continued)

Primary Examiner—Ha Tran Nguyen
(74) Attorney, Agent, or Firm—Schwegman, Lundberg, Woessner & Kluth, P.A.

(57) ABSTRACT

A multi-anodic aluminum electrolytic capacitor includes an electrical connection to the multiple porous (e.g., tunnel-etched) anodes in an anode stack using a single anode tab that is attached only to a first anode. Other anodes are electrically coupled to the anode tab through the first anode. Anodes in the anode stack are in intimate physical and electrical contact with other such anodes as a result of layering effected by planar stacking or cylindrical winding. The need for separate tabs to different anode layers is eliminated or at least minimized, thereby reducing capacitor volume, increasing capacitor reliability, and reducing the cost and complexity of the capacitor manufacturing process for multi-anodic capacitors. The capacitor is capable of use in implantable defibrillators, camera photoflashes, and other electric circuit applications.

8 Claims, 12 Drawing Sheets

U.S. PATENT DOCUMENTS

| | | | |
|---|---|---|---|
| 3,659,615 A | 5/1972 | Enger | 128/419 P |
| 3,765,956 A | 10/1973 | Li | 148/33 |
| 3,789,502 A | 2/1974 | Callins et al. | 29/570 |
| 3,918,460 A | 11/1975 | King et al. | 128/419 P |
| 3,943,937 A | 3/1976 | King et al. | 128/419 P |
| 4,041,955 A | 8/1977 | Kelly et al. | 128/419 P |
| 4,041,956 A | 8/1977 | Purdy et al. | 128/419 P |
| 4,136,435 A | 1/1979 | Li | 29/572 |
| 4,183,600 A | 1/1980 | Schroeder | 339/218 R |
| 4,243,042 A | 1/1981 | Ware | 128/419 P |
| 4,333,469 A | 6/1982 | Jeffcoat et al. | 128/419 F |
| 4,371,406 A | 2/1983 | Li | 148/171 |
| 4,385,342 A | 5/1983 | Puppolo et al. | 361/433 |
| 4,395,305 A | 7/1983 | Whitman | 156/665 |
| 4,446,188 A | 5/1984 | Patel et al. | 428/138 |
| 4,521,830 A | 6/1985 | Aultman et al. | 361/433 |
| 4,546,415 A | 10/1985 | Kent et al. | 361/433 |
| 4,663,824 A | 5/1987 | Kenmochi | 29/570 |
| 4,690,714 A | 9/1987 | Li | 437/208 |
| 4,692,147 A | 9/1987 | Duggan | 604/93 |
| 4,771,362 A | 9/1988 | Behn | 361/306 |
| 4,782,235 A | 11/1988 | Lejeune et al. | 250/423 R |
| 4,844,711 A | 7/1989 | Witte | 204/11 |
| 4,907,130 A | 3/1990 | Boulloy et al. | 361/529 |
| 4,942,501 A | 7/1990 | MacFarlane et al. | 361/523 |
| 4,944,300 A | 7/1990 | Saksena | 128/419 D |
| 4,987,519 A | 1/1991 | Hutchins et al. | 361/518 |
| 5,055,889 A | 10/1991 | Beall | 357/14 |
| 5,055,975 A | 10/1991 | Behrend | 361/527 |
| 5,086,374 A | 2/1992 | MacFarlane et al. | 361/525 |
| 5,131,388 A | 7/1992 | Pless et al. | 128/419 D |
| 5,146,391 A | 9/1992 | MacFarlane et al. | 361/525 |
| 5,153,820 A | 10/1992 | MacFarlane et al. | 361/525 |
| 5,245,499 A | 9/1993 | Senes | 361/56 |
| 5,275,621 A | 1/1994 | Mehra | 607/5 |
| 5,324,910 A | 6/1994 | Isawa | 219/118 |
| 5,370,663 A | 12/1994 | Lin | 607/5 |
| 5,380,341 A | 1/1995 | Matthews et al. | 29/25.03 |
| 5,439,760 A | 8/1995 | Howard et al. | 429/94 |
| 5,456,698 A | 10/1995 | Byland et al. | 607/36 |
| 5,468,984 A | 11/1995 | Efland et al. | 257/356 |
| 5,500,534 A | 3/1996 | Robinson et al. | 250/385.1 |
| 5,522,851 A | 6/1996 | Fayram | 607/5 |
| 5,536,960 A | 7/1996 | Hayashi | 257/369 |
| 5,536,964 A | 7/1996 | Green et al. | 257/432 |
| 5,545,184 A | 8/1996 | Dougherty | 607/5 |
| 5,584,890 A | 12/1996 | MacFarlane et al. | 29/25.03 |
| 5,591,211 A | 1/1997 | Meltzer | 607/5 |
| 5,597,658 A | 1/1997 | Kejha | 429/94 |
| 5,628,801 A | 5/1997 | MacFarlane et al. | 29/25.03 |
| 5,642,252 A | 6/1997 | Sakamoto et al. | 361/93 |
| 5,660,737 A | 8/1997 | Elias et al. | 216/6 |
| 5,661,625 A | 8/1997 | Yang | 361/92 |
| 5,661,629 A | 8/1997 | MacFarlane et al. | 361/505 |
| 5,667,909 A | 9/1997 | Rodriguez et al. | 429/127 |
| 5,674,260 A | 10/1997 | Weinberg | 607/36 |
| 5,677,539 A | 10/1997 | Apotovsky et al. | 250/370.13 |
| 5,680,685 A | 10/1997 | Bischoff | 29/25.42 |
| 5,688,698 A | 11/1997 | Robinson et al. | 437/3 |
| 5,697,953 A | 12/1997 | Kroll et al. | 607/5 |
| 5,698,453 A | 12/1997 | Green et al. | 437/3 |
| 5,711,861 A | 1/1998 | Ward et al. | 204/403 |
| 5,711,988 A | 1/1998 | Tsai et al. | 427/80 |
| 5,728,150 A | 3/1998 | McDonald et al. | 623/1 |
| 5,728,594 A | 3/1998 | Efland et al. | 437/40 |
| 5,748,439 A | 5/1998 | MacFarlane et al. | 361/525 |
| 5,776,628 A | 7/1998 | Kraft et al. | 429/94 |
| 5,800,857 A | 9/1998 | Ahmad et al. | 427/80 |
| 5,808,857 A | 9/1998 | Stevens | 361/503 |
| 5,814,082 A | 9/1998 | Fayram et al. | 607/5 |
| 5,822,177 A | 10/1998 | Popp et al. | 361/508 |
| 5,837,995 A | 11/1998 | Chow et al. | 250/214 LS |
| 5,859,456 A | 1/1999 | Efland et al. | 257/335 |
| 5,867,363 A | 2/1999 | Tsai et al. | 361/502 |
| 5,895,416 A | 4/1999 | Barreras, Sr. et al. | 607/62 |
| 5,895,733 A | 4/1999 | Crespi et al. | 429/219 |
| 5,904,514 A | 5/1999 | Konuma et al. | 438/165 |
| 5,926,357 A | 7/1999 | Elias et al. | 361/302 |
| 5,930,109 A | 7/1999 | Fishler | |
| 5,949,638 A | 9/1999 | Greenwood, Jr. et al. | 361/508 |
| 5,959,535 A | 9/1999 | Remsburg | 340/604 |
| 5,963,418 A | 10/1999 | Greenwood, Jr. et al. | 361/508 |
| 5,968,210 A | 10/1999 | Strange et al. | 29/25.03 |
| 5,980,977 A | 11/1999 | Deng et al. | 427/79 |
| 5,983,472 A | 11/1999 | Fayram et al. | 29/25.42 |
| 6,006,133 A | 12/1999 | Lessar et al. | 607/5 |
| 6,009,348 A | 12/1999 | Rorvick et al. | 607/5 |
| 6,157,531 A | 12/2000 | Breyen et al. | 361/519 |
| 6,249,423 B1 | 6/2001 | O'Phelan et al. | 361/502 |

OTHER PUBLICATIONS

*Patent Abstracts of Japan*, 16 (*134*), Publication No. 03296207 (K. Kaname),(Dec. 26, 1991),1 p.

*Patent Abstracts of Japan*, 18 (*3*), Publication No. 05251283 (T. Fumiyasu),(Sep. 28, 1993),1 p.

*Patent Abstracts of Japan*, 97 (*12*), Publication No. 09219343 (I. Toshihiko),(Aug. 19, 1997),1 p.

"Understanding Aluminum Electrolytic Capacitors", *United Chemi–Con*, (Date Unknown),7 p.

Jenkins, et al., "Diagnosis of Atrial Fibrillation Using Electrogram from Chronic Leads: Evaluation of Computer Algorithm", *PACE, 11*, (1988),pp. 622–631.

Lunsman, P., et al., "High Energy Density Capacitors for Implantable Defibrillators", *Proceedings of the 16th Capacitor and Resistor Technology Symposium*, Monteleone Hotel, New Orleans, Louisiana,(Mar. 11–15, 1996),pp.277–280.

Morris, et al., "Intracardiac Electrogram Transformation: Morphometric Implications for Implantable Devices", *Journal of Electrocardiology, 29 Supplement*, (1996),pp. 124–129.

Moynihan, J. D., et al., "Theory, Design and Application of Electrolytic Capacitors", Copyright by John D. Moynihan, (1982),136 p.

Schuller, et al., "Far Field R–Wave Sensing—An Old Problem Repeating", *PACE, 19, Part II*, NASPE Abstract No. 264,(1996),p. 631.

Stephany, et al., "Real–Time Estimation of Magnitude–Square Coherence for Use in Implantable Devices", *IEEE Computers in Cardiology*, (1992),pp. 375–378.

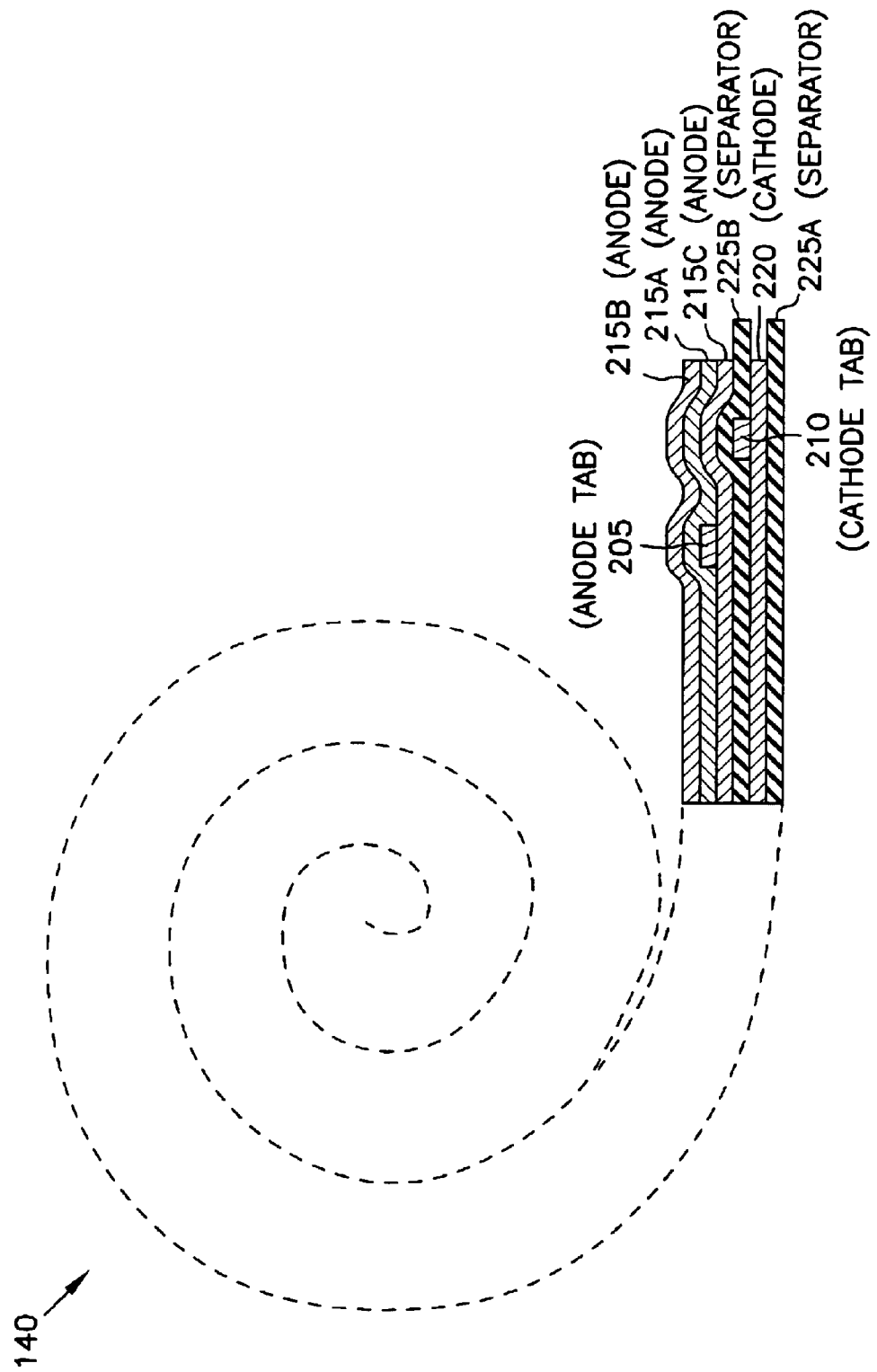

ELECTROLYTIC CAPACITOR AND MULTI-ANODIC ATTACHMENT

CROSS-REFERENCE TO RELATED APPLICATION(S)

This application is a division of U.S. patent application Ser. No. 09/884,864, filed on Jun. 19, 2001 now U.S. Pat. No. 6,597,564, which is a continuation of U.S. patent application Ser. No. 09/063,692, filed on Apr. 21, 1998, now issued as U.S. Pat. No. 6,249,423, the specifications of which are incorporated herein by reference.

TECHNICAL FIELD OF THE INVENTION

This invention relates generally to capacitors and particularly, but not by way of limitation, to a multi-anodic electrolytic capacitor and attachment to the multiple anodes.

BACKGROUND OF THE INVENTION

Capacitors are electrical components that store electrical energy in an electromagnetic field between electrodes that are separated by a dielectric insulator. Each electrode carries a charge that is opposite in polarity to the charge on the other electrode. Capacitors find many applications in a wide variety of electric circuits. Some applications require the capacitor to withstand a high voltage between its electrodes. For example, some camera flash devices produce light by an electric discharge in a gas. A high voltage is required to create the discharge. A power converter transforms a low voltage obtained from a battery into a high voltage, which is stored on the capacitor and used to trigger the flash. In another example, external and implantable defibrillators deliver a high voltage electrical countershock to the heart. The countershock restores the heart's rhythm during cardiac arrhythmias such as life-threatening ventricular fibrillation. In an implantable defibrillator, a power converter transforms a low voltage (e.g., approximately 3.25 Volts), obtained from a battery, into a high voltage (e.g., approximately 750 Volts), which is stored on capacitors and used to defibrillate the heart.

Electrolytic capacitors are used in cameras, defibrillators, and for other electric circuit applications. An electrolytic capacitor includes two electrodes: an anode and a cathode. The dielectric insulator between the anode and cathode is formed by anodizing the anode electrode (i.e., growing an oxide on the anode). The anode and cathode electrodes are physically separated from each other by a porous separator that is soaked with a conductive electrolyte solution. The electrolyte acts as a part of the cathode electrode. A parallel plate capacitor is formed by a substantially parallel planar arrangement of superjacent anode and cathode plates. A separator is interposed in between the anode and cathode electrode plates. A cylindrical capacitor is formed by winding anode, cathode, and separator strips into a spiraled cylindrical roll. For electrically connecting the capacitor in an electric circuit, tabs are joined to the anode and cathode. The tabs protrude outwardly from an end of the cylinder so that the capacitor can be connected in the electric circuit.

By maximizing the energy density of a capacitor, its volume can be reduced. This is particularly important for implantable medical devices, such as implantable defibrillators, since the defibrillation energy storage capacitor occupies a significant portion of the implantable defibrillator device. Smaller implantable defibrillator devices are desired. Smaller defibrillators are easier to implant in a patient. Also, for a particular defibrillator size, a smaller capacitor allows the use of a larger battery, which increases the effective usable life of the implanted device before surgical replacement is required. Thus, one goal of implantable defibrillator design is to maximize capacitor energy density and minimize capacitor volume.

The energy density of a capacitor increases in proportion to a corresponding increase in the surface area of the anode. For example, an anode having a particular macroscopic surface area can be roughened to increase its microscopic surface area. The capacitance per unit of macroscopic surface area, which is sometime referred to as the foil gain of the capacitor, increases as a result of roughening techniques. One such roughening technique includes tunnel etching tiny openings partially or completely through the anode electrode strip.

Anode surface area is further increased by stacking multiple tunnel-etched anodes, thereby obtaining even more surface area and, in turn, an even capacitance per unit area of the anode stack. However, in such multi-anodic capacitors, an electrical connection to each anode in the stack is still required. One approach to making an electrical connection to each anode in the stack is to join a connecting tab to each anode. Individually joining such tabs to each anode, however, increases the volume of the capacitor. Cylindrical capacitors, for example, will bulge as a result of each tab that is inserted into the roll and joined to an anode strip. Not only does this disadvantageously increase the capacitor volume, it increases reliability concerns. Joining tabs to the anode strips causes mechanical stresses, such as at the joints between the tab and the anode strip, and within the anode strip near the edges of the tab. Tunnel-etched anode strips are extremely brittle, making the anodes highly susceptible to such mechanical stresses. Thus, significant disadvantages arise from providing separate tabs to individually contact each anode strip.

Capacitor volume can be reduced slightly by interposing a shared tab in between two adjacent anode plates in the anode stack, such as described in Pless et al. U.S. Pat. No. 5,131,388, entitled, "IMPLANTABLE CARDIAC DEFIBRILLATOR WITH IMPROVED CAPACITORS." This technique still requires at least one tab for every two adjacent anode plates, thereby limiting the reduction in capacitor volume that is obtained. Even more disadvantageously, the Pless et al. patent requires that each double anode is formed by welding two anode plates together with an aluminum strip (i.e., a tab) between them for electrical contact. Not only does such welding add complexity and expense to the manufacture of the capacitor, it causes reliability concerns because the extremely brittle tunnel etched anodes may be further weakened by the welding process. The process of joining anode plates by welding is also described in Elias et al. U.S. Pat. No. 5,660,737 entitled "PROCESS FOR MAKING A CAPACITOR FOIL WITH ENHANCED SURFACE AREA," in which each anode plate must have an electrical connection to the anode terminal, and the anode plates are joined to each other and a tab connection by welding.

Another example of a multi-anodic capacitor is described in MacFarlane et al. U.S. Pat. No. 5,584,890 entitled "METHODS OF MAKING MULTIPLE ANODE CAPACITORS." MacFarlane et al. describes a triple layer anode stack in which an opening in the intermediate anode layer receives an inserted tab that is shared between the adjacent three anodes, each of which must contact the tab. This technique still requires at least one tab for every three adjacent anode plates, thereby limiting the reduction in capacitor volume that is obtained. Even more disadvantageously, the MacFarlane et al. patent requires that each triple anode stack is formed by joining the three anode plates together using cold welding, laser welding, or arc welding, even though, as recognized by MacFarlane et al., "highly etched oxidized anode foil is brittle and difficult to join."

Thus, there is a need for further reducing capacitor volume, increasing capacitor reliability, and reducing cost and complexity of the capacitor manufacturing process, for multi-anodic capacitors used in implantable defibrillators, camera photoflashes, and other electric circuit applications.

SUMMARY OF THE INVENTION

The above-mentioned shortcomings, disadvantages and problems are addressed by the present invention, which will be understood by reading and studying the following specification. The present invention provides, among other things, a capacitor. In one embodiment, the capacitor includes a first anode, a cathode, and a separator between the first anode and the cathode. The separator carries an electrolyte. A tab is physically and electrically coupled to the first anode, such as for providing an external circuit connection. A second anode is physically separated from the tab and electrically coupled to the tab through the first anode. The unjoined first and second anodes are electrically intercoupled by physical contact between the first and second anodes.

Though portions of the invention are described in particular with respect to first and second anodes in a multi-anode stack, it is understood that, in other embodiments, the multi-anode stack includes more than two anodes.

In various further embodiments, the first and second anodes are physically and electrically intercoupled by physical contact between the first and second anodes at a plurality of points (e.g., distributed throughout an interface between the first and second anodes). The capacitor further comprising a dielectric that includes oxidized portions of the first anode, or of the first and second anodes. In one example, the physical contact between the first and second anodes is effected by a planar layering of the first and second anodes, such as by arranging the first and second anodes, the separator, and the cathode in an approximately planar and approximately superjacent configuration. In another example, the physical contact between the first and second anodes is effected by a cylindrically wound layering of the first and second anodes, such as by winding the first and second anodes, the separator, and the cathode include strips in an approximately cylindrical configuration. In one embodiment, at least one of the first and second anodes is porous (e.g., including tunnel-etched aluminum foil).

In a further embodiment, the present invention provides, among other things, an implantable cardiac rhythm management system including the capacitor described above. The system further comprises an implantable defibrillator carrying the capacitor, and a leadwire that is adapted to be coupled to a heart for delivering an electrical countershock energy that is stored on the capacitor.

In another embodiment of the present invention, a capacitor includes a first anode, a cathode, and a separator between the first anode and the cathode. The separator carries a conductive electrolyte. A tab is physically and electrically coupled to the first anode. A second anode is physically separated from the tab and electrically coupled to the tab through the first anode. A dielectric includes oxide on at least one surface of the first and second anodes. The dielectric electrically isolates the first and second anodes from the electrolyte and the cathode. The first and second anodes are physically layered in intimate contact with each other. This breaks through portions of the oxide on opposing surfaces of the first and second anodes, resulting in electrical contact between the first and second anodes.

In another embodiment of the present invention, the capacitor includes a first anode, a cathode, and a separator between the first anode and the cathode. The separator carries a conductive electrolyte. A tab is physically and electrically coupled to the first anode. The capacitor also includes a plurality of second anodes. Each second anode is physically separated from the tab and electrically coupled to the tab through the first anode. A dielectric includes oxidized portions of ones of the first and second anodes. The dielectric electrically isolates the first and second anodes from the electrolyte and the cathode. The unjoined first and second anodes are physically and electrically intercoupled by physical contact between the first and second anodes.

In various further embodiments, the first and second anodes are physically layered in intimate contact with each other. This breaks through portions of the oxide on opposing surfaces of the first and second anodes, resulting in electrical contact between the first and second anodes.

In another embodiment, the present invention includes a method of forming a capacitor. The method includes disposing a separator between a first anode and a cathode. The separator carries a conductive electrolyte. A tab is physically and electrically coupled to the first anode. A second anode is disposed to be physically separated from the tab. A second anode is electrically coupled to the tab through the first anode by physically contacting the unjoined first and second electrodes.

In various further embodiments, the method includes, for example, further including arranging the first and second anodes, the separator, and the cathode in an approximately planar and approximately superjacent configuration. In another example, the method further includes winding strips of the first and second anodes, the separator, and the cathode in an approximately cylindrical configuration. In one embodiment, electrically coupling a second anode to the tab through the first anode includes physically layering the first and second anodes in intimate contact with each other, thereby breaking through portions of the oxide on opposing surfaces of the first and second anodes and resulting in electrical contact between the first and second anodes.

Thus, the present invention provides, among other things, a multi-anodic electrolytic capacitor and electrical connection to the multiple anodes in an anode stack using a single anode tab that is attached only to a first anode. Other anodes are electrically coupled to the anode tab through the first anode. Anodes in the anode stack are in intimate physical and electrical contact with other such anodes.

The present invention reduces capacitor volume, increases capacitor reliability, and reduces the cost and complexity of the capacitor manufacturing process for multi-anodic capacitors. The present invention is capable of use in implantable defibrillators, camera photoflashes, and other electric circuit applications. Other advantages will become apparent upon reading the following detailed description of the invention and viewing the accompanying drawings that form a part thereof.

BRIEF DESCRIPTION OF THE DRAWINGS

In the drawings, like numerals describe substantially similar components throughout the several views. Shapes and dimensions are not critical unless indicated as such in the drawing or the accompanying detailed description of the invention.

FIG. 3 is a cross-sectional view that illustrates generally one embodiment of portions of a capacitor.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the scope of the present invention. The following detailed description is, therefore, not to be taken in a limiting sense, and the scope of the present invention is defined by the appended claims and their equivalents.

The present invention provides, among other things, a multi-anodic electrolytic capacitor and attachment to the multiple anodes. The present invention reduces capacitor volume, increases capacitor reliability, and reduces the cost and complexity of the capacitor manufacturing process for multi-anodic capacitors. The present invention is capable of use in implantable defibrillators, camera photoflashes, and other electric circuit applications, as will become apparent by reading the following detailed description of the invention and viewing the accompanying drawings which form a part thereof.

Figure 1:
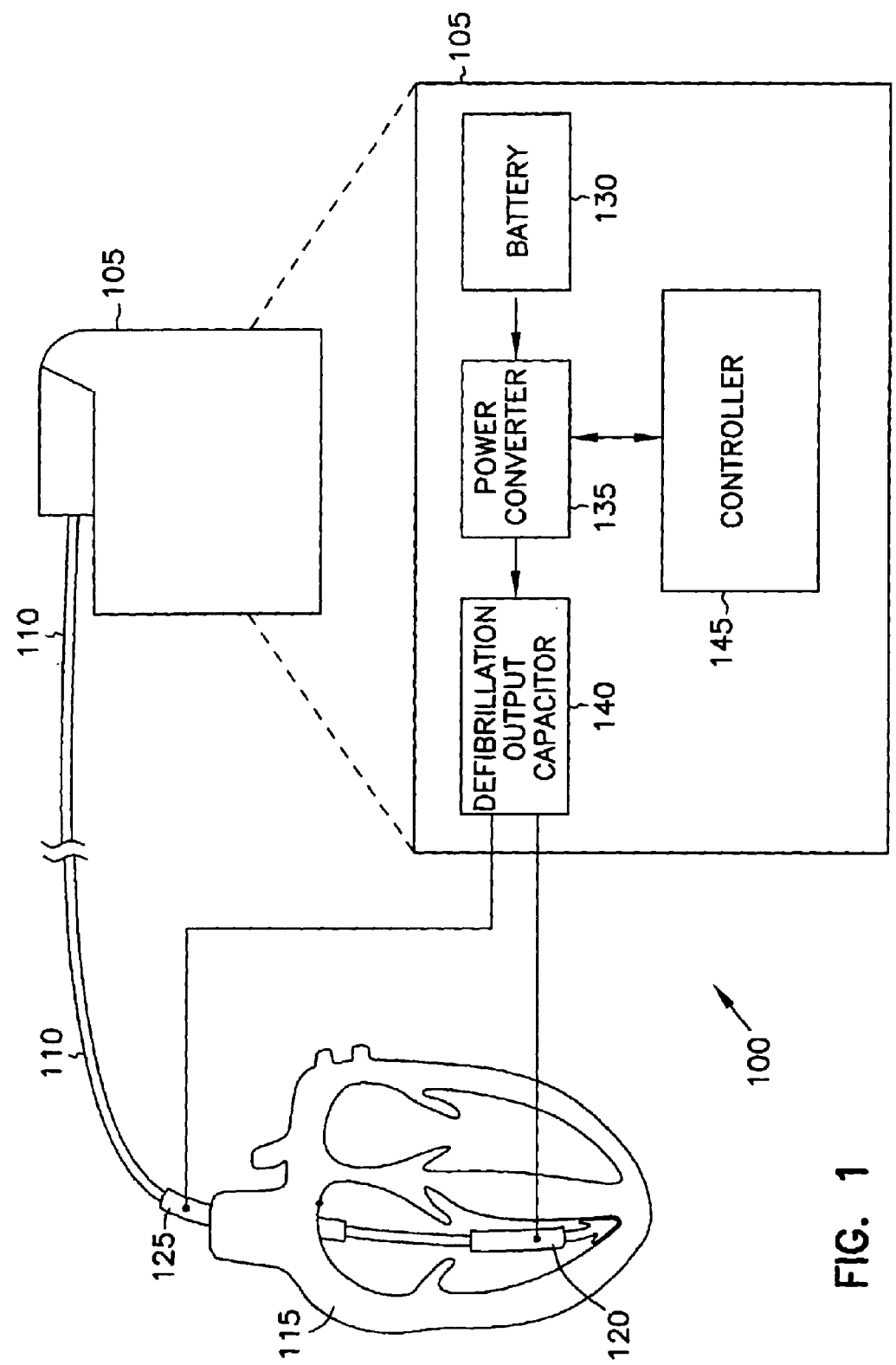
FIG. 1 is a schematic/block diagram illustrating generally one embodiment of a cardiac rhythm management system according to one aspect of the present invention.

FIG. 1 is a schematic/block diagram illustrating generally, by way of example, but not by way of limitation, one embodiment of a cardiac rhythm management system 100 according to one aspect of the present invention. System 100 includes, among other things, cardiac rhythm management device 105 and leadwire ("lead") 110 for communicating signals between device 105 and a portion of a living organism, such as heart 115. In the illustrated example, device 105 includes an automatic implantable cardioverter/defibrillator (AICD), but any other apparatus for cardiac rhythm management is also included within the present invention.

In the illustrated embodiment, portions of system 100 is implantable in the living organism, such as in a pectoral or abdominal region of a human patient, or elsewhere. In another embodiment, portions of system 100 (e.g., device 105) are alternatively disposed externally to the human patient. In the illustrated embodiment, portions of lead 110 are disposed in the right ventricle, however, any other positioning of lead 110 is included within the present invention. In one embodiment, lead 110 is a commercially available endocardial defibrillation lead. System 100 can also include other leads in addition to lead 110, appropriately disposed, such as in or around heart 115, or elsewhere.

In one example, a first conductor of multiconductor lead 110 electrically couples a first electrode 120 to device 105. A second conductor of multiconductor lead 110 independently electrically couples a second electrode 125 to device 105. Device 105 includes an energy source, such as battery 130, a power converter 135, such as a flyback converter, at least one defibrillation output capacitor 140, and a controller 145 for controlling the operation of device 105. In one embodiment, power converter 135 transforms the terminal voltage of battery 130, which is approximately between 2 Volts and 3.25 Volts, into an approximately 700–800 Volt (maximum) defibrillation output energy pulse stored on the defibrillation output capacitor 140. In another embodiment, power converter 135 transforms the terminal voltage of two series-coupled batteries, which is approximately between 4 Volts and 6.25 Volts, into the approximately 700–800 Volt (maximum) defibrillation output energy pulse stored on the defibrillation output capacitor 140. In particular modes of operation, lesser defibillation output energies and voltages are delivered (e.g., defibrillation output energies that are approximately between 0.1–40 Joules, and defibrillation output voltages that range approximately between 10–800 Volts).

Figure 2A:
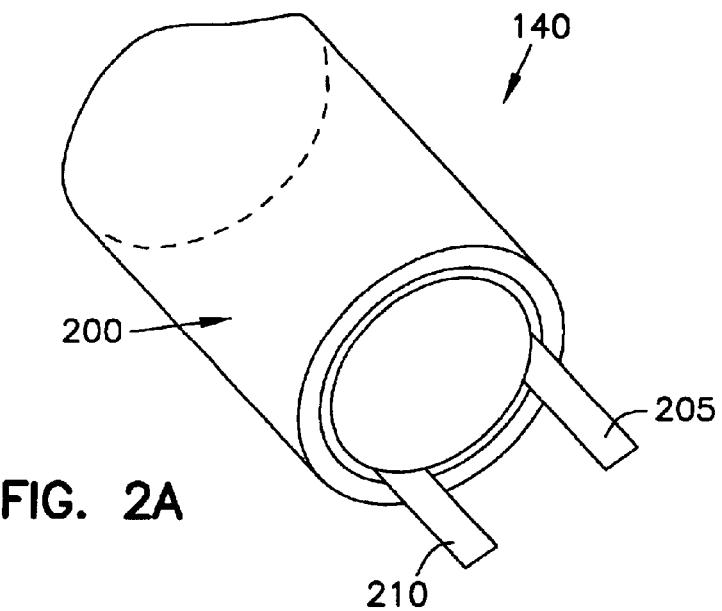
FIG. 2A illustrates generally one embodiment of a cylindrical capacitor.

FIG. 2A illustrates generally, by way of example, but not by way of limitation, one embodiment of a cylindrical capacitor 140. In one embodiment, capacitor 140 includes a case 200 for carrying, enclosing, or sealing a spirally wound aluminum electrolytic capacitor, as described below. Anode connection tab 205 and cathode connection tab 210 provide electrical access to respective anode and cathode terminals of capacitor 140, as described below.

Figure 2B:
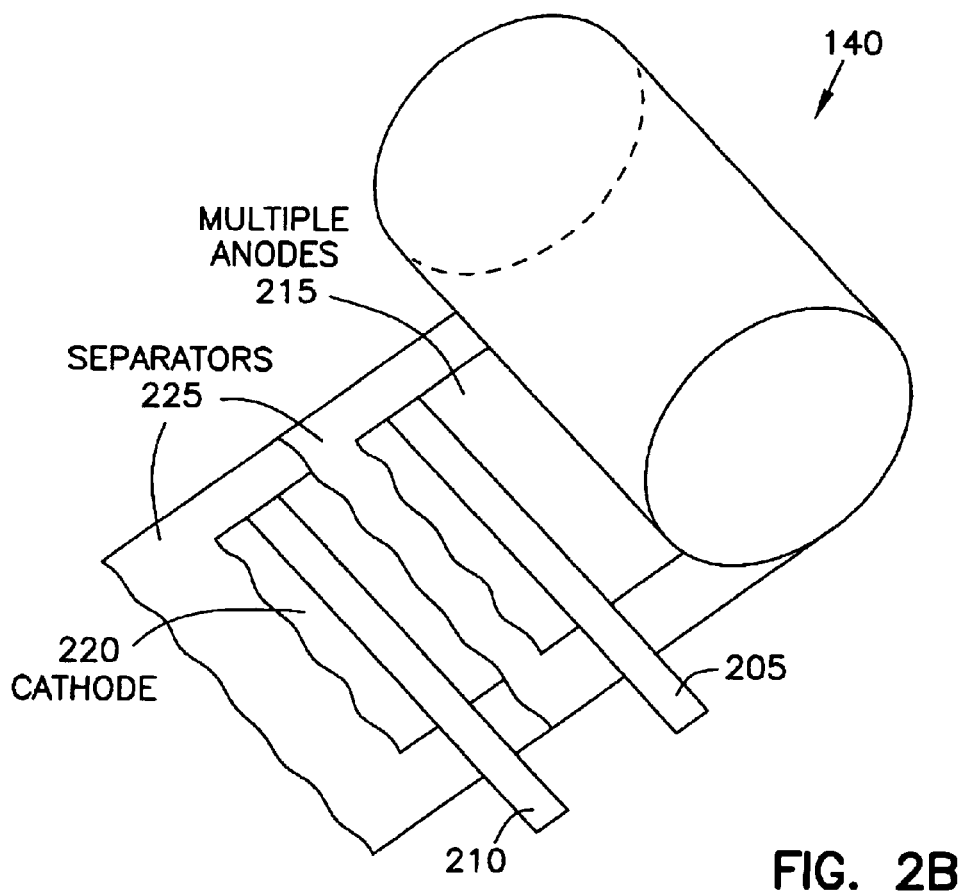
FIG. 2B illustrates generally one embodiment of partially unrolled portions of a cylindrical electrolytic capacitor.

FIG. 2B illustrates generally, by way of example, but not by way of limitation, one embodiment of a partially unrolled portion of a cylindrical aluminum electrolytic capacitor 140. Anode connection tab 205 physically and electrically contacts portions of at least one anode of multiple anode stack 215, which is a ribbon or strip that forms a first electrode of capacitor 140. Cathode connection tab 210 physically and electrically contacts portions of cathode 220, which is a ribbon or strip that forms a second electrode of capacitor 140. One or more separators 225 on each side of cathode 220 provides physical separation between cathode 220 and anode stack 215 when spirally rolled up together into a cylindrically shaped capacitor 140. In one embodiment, each of separators 225 includes one or more paper strips. For example, using two paper strips obtains redundancy that better protects against anode-to-cathode short-circuits in the event of pinholes in the paper strips. In one embodiment, permeable separators 225 carry a conductive electrolyte that, together with cathode strip 220 and cathode connection tab 210, forms the second electrode (i.e., a cathode electrode) of capacitor 140. However, the present invention is not limited to use only in capacitors using a liquid conductive electrolyte.

FIG. 3 is a cross-sectional view that illustrates generally, by way of example, but not by way of limitation, one embodiment of portions of capacitor 140. Cathode 220 is separated from anode stack 215 by separators 225A-B. Anode stack 215 includes a stacked configuration of multiple anodes, such as first anode 215A, second anode 215B, and third anode 215C. In one embodiment, each of anodes 215A-C is a high foil-gain tunnel-etched aluminum foil strip that has been anodized (i.e., a thin insulating aluminum oxide layer has been grown on each surface of each of the aluminum foil anodes 215A-C). The aluminum oxide layer formed on third anode 215C provides a capacitor dielectric between third anode 215C and the conductive electrolyte carried by separator 225B. The aluminum oxide layer formed on second anode 215B provides a capacitor dielectric between second anode 215B and cathode 220.

According to one aspect of the invention, an anode connection tab 205 is physically and electrically coupled to first anode 215A, such as by being physically joined together by cold welding, swaging, ultrasonic or spot welding, riveting, or any other suitable joining process. Second anode 215B is physically separated from tab 205, such as by first anode 215A, which is interposed in between second anode 215B and tab 205. Second anode 215B is, however, electrically coupled to tab 205 through first anode 215A, to which second anode 215B is physically and electrically intercoupled, without joining, such as by intimate physical contact between first anode 215A and second anode 215B. (In this application, joining is defined as physically uniting, attaching, or affixing two separate elements into a single mechanically combined unitary element by welding, including cold welding by stamping, to join the two elements together. Unjoined elements are not welded together, but can instead be in intimate physical contact with each other, without joining.) Second anode 215B is unjoined to each of first anode 215A and tab 205.

Figure 4:
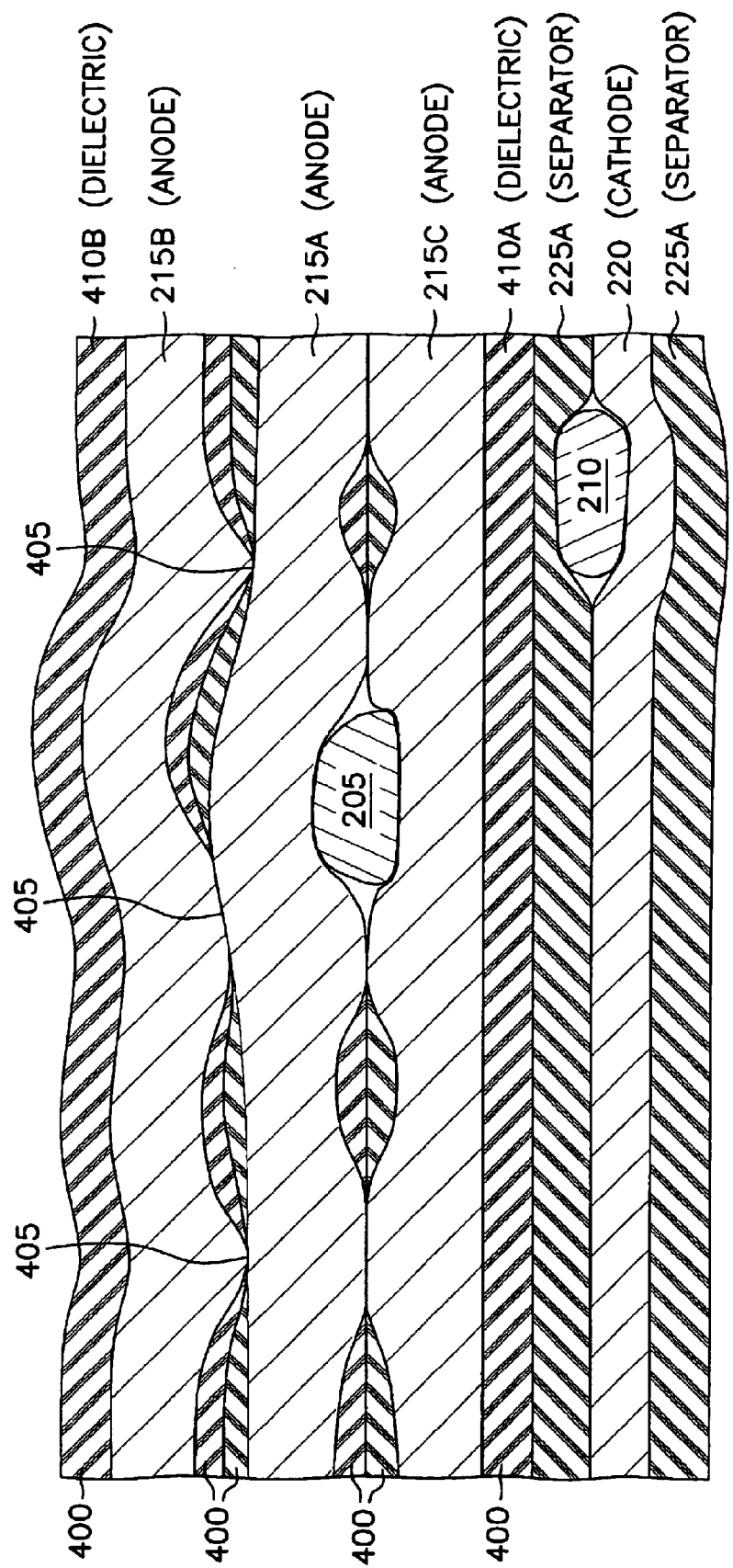
FIG. 4 is a cross-sectional view that illustrates generally one embodiment of an unrolled portion of a capacitor.

FIG. 4 is a cross-sectional view that illustrates generally, by way of example, but not by way of limitation, one embodiment of an unrolled portion of capacitor 140. FIG. 4 more clearly illustrates the oxide 400 on the anodized surfaces of anodes 215A-C. Anode tab 205 is joined to one or both of first anode 215A and third anode 215C, such as described above. As discussed above, the starting material for each first anode 215A, second anode 215B, and third anode 215C is oxidized on both surfaces by anodization. In one embodiment, joining first anode 215A and third anode 215C to tab 205 breaks through portions of intervening insulating oxide 400, resulting in physical and electrical contact between tab 205 and each of first anode 215A and third anode 215C.

It is believed that a compressive force between first anode 215A and second anode 215B breaks through portions of intervening insulating oxide 400. This is believed to result in intimate physical and electrical contact between first anode 215A and second anode 215B, such as at a plurality of points distributed throughout the interface between first anode 215A and second anode 215B, as illustrated in FIG. 4. Thus, physical contact between first anode 215A and second anode 215B is obtained at unoxidized (e.g., broken through) portions 405 of the interface between first anode 215A and second anode 215B.

In one embodiment, this intimate physical contact between first anode 215A and second anode 215B is obtained from compressive force applied during the spiral winding of the constituent strips into the cylindrical capacitor 140 of FIG. 3. However, other techniques of applying compressive force or pressure to break through oxide 400 or otherwise obtain electrical contact between first anode 215A and second anode 215B are also included within the invention. In general, enough force should be applied to break through portions of oxide 400 between adjacent anodes in the stacked multi-anode strip 215. The applied force should not be so great as to damage oxide dielectrics 410A-B, which are also formed by anodization. Dielectric 410A is in contact with somewhat pliant separator 225B (e.g., comprising gauze fabric or kraft paper). Similarly, dielectric 410B is in contact with somewhat pliant separator 225A. In one embodiment, separators 225A-B are sufficiently yielding to protect against damage to oxide dielectrics 410A-B when force is applied during spiral winding or otherwise.

According to one aspect of the invention illustrated in FIG. 4, second anode 215B, of stacked multi-anode strip 215, need not directly contact anode tab 205. Instead, second anode 215B is electrically coupled to anode tab 205 through first anode 215A. In another embodiment, additional anode layers are added in multi-anode strip 215. Particular ones of these additional anode layers need not directly contact anode tab 205. Instead, these additional anode layers are electrically coupled to anode tab 205 through other anode layers in multi-anode strip 215.

Figure 5:
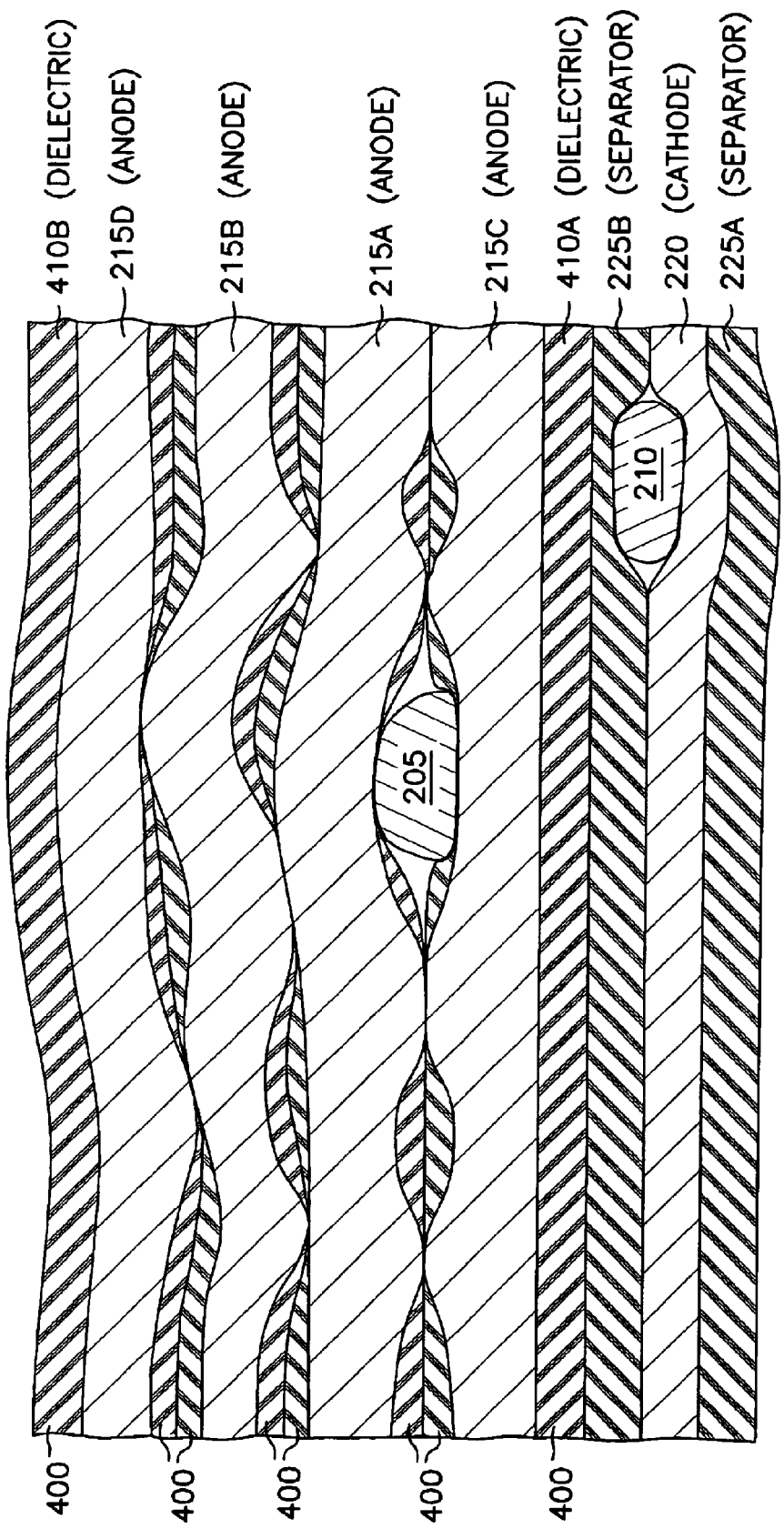
FIG. 5 is a cross-sectional view that illustrates generally another embodiment of an unrolled portion of a capacitor.

FIG. 5 is a cross-sectional view that illustrates generally, by way of example, but not by way of limitation, another embodiment of an unrolled portion of capacitor 140. FIG. 5 illustrates a fourth anode 215D in multi-anode strip 215. In one embodiment, fourth anode 215D electrically contacts second anode 215B as a result of intimate physical contact between fourth anode 215D and second anode 215B, such as obtained by the force of spirally winding cylindrical capacitor 140, as described above. As a result, fourth anode 215D is electrically coupled to anode tab 205 through second anode 215B and first anode 215A.

Further anode layers, beyond those illustrated in FIG. 5, can also be added. These additional anode layers are similarly electrically coupled to a tab 205 that is not in direct physical contact with such additional anode layers. The additional anode layers increase the anode surface area which, in turn, results in a higher foil gain and an increased capacitance per unit volume. A smaller capacitor results. The smaller capacitor advantageously reduces the size of implantable cardiac rhythm management device 105 or, alternatively, allows the use of a bigger battery to provide increased implanted longevity of device 105.

According to another aspect of the invention, tab 205 is joined only to first anode 215A. This avoids the need for joining multiple anodes in anode stack 215A to tab 205. Instead, particular anodes are electrically coupled to tab 205 through intimate physical contact with other anodes, as described above. Because the tunnel-etched oxidized anodes are extremely brittle, they are difficult to join, as discussed above. The present invention, however, eliminates, or at least minimizes, the need to join anodes to anode tab 205.

Figure 6:
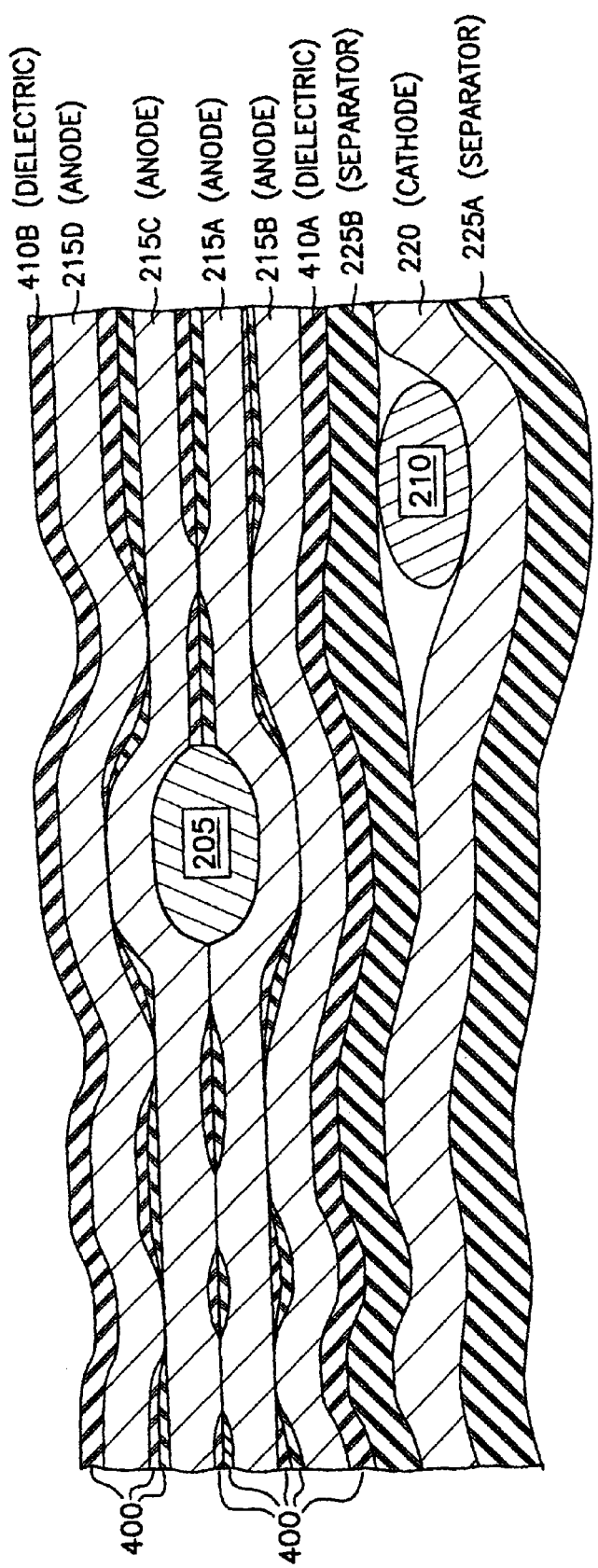
FIG. 6 is a cross-sectional view that illustrates generally another embodiment of an unrolled portion of a capacitor.

FIG. 6 is a cross-sectional view that illustrates generally, by way of example, but not by way of limitation, another embodiment of an unrolled portion of capacitor 140. In FIG. 6, multiple anode layers in anode stack 215 are disposed on either side of anode tab 205. For example, first anode 215A and second anode 215B are disposed between anode tab 205 and separator 225B. Second anode 215B is physically isolated from anode tab 205, but is electrically coupled to anode tab 205 through first anode 215A, as described above. Third anode 215C and fourth anode 215B are disposed on the opposite side of anode tab 205. Fourth anode 215D is physically isolated from anode tab 205, but is electrically coupled to anode tab 205 through third anode 215C, as described above.

Figure 7:
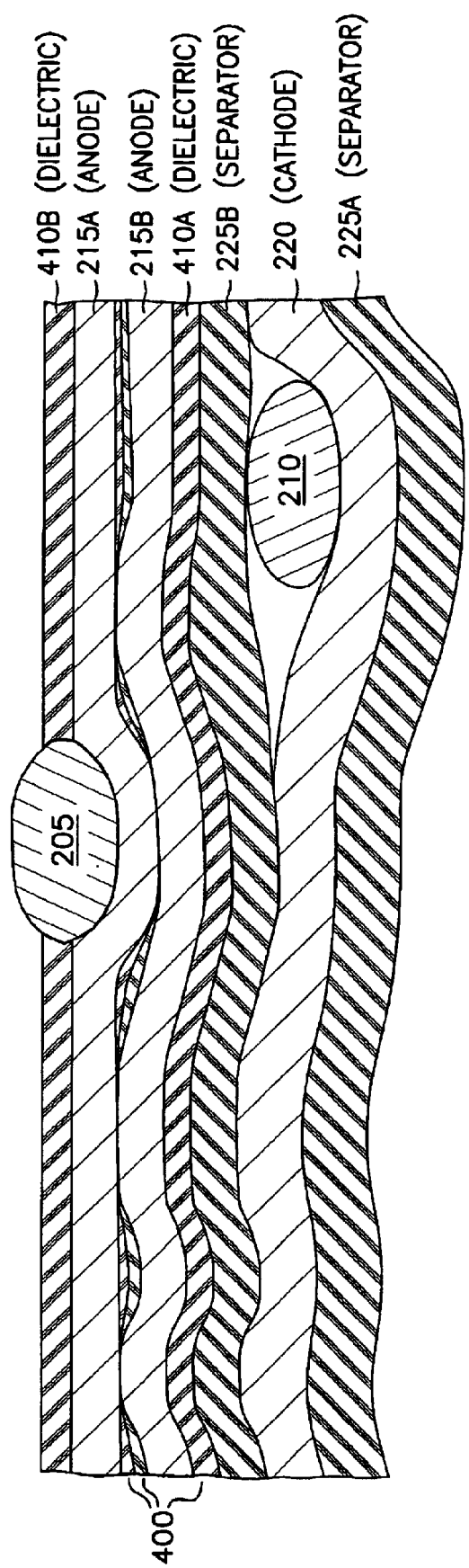
FIG. 7 is a cross-sectional view that illustrates generally another embodiment of an unrolled portion of a capacitor.

FIG. 7 is a cross-sectional view that illustrates generally, by way of example, but not by way of limitation, another embodiment of an unrolled portion of capacitor 140. In FIG. 7, anode stack 215 includes only two anode layers, such as first anode 215A and second anode 215B. Second anode 215B is physically isolated from anode tab 205, but is electrically coupled to anode tab 205 through first anode 215A, as described above.

Figure 8:
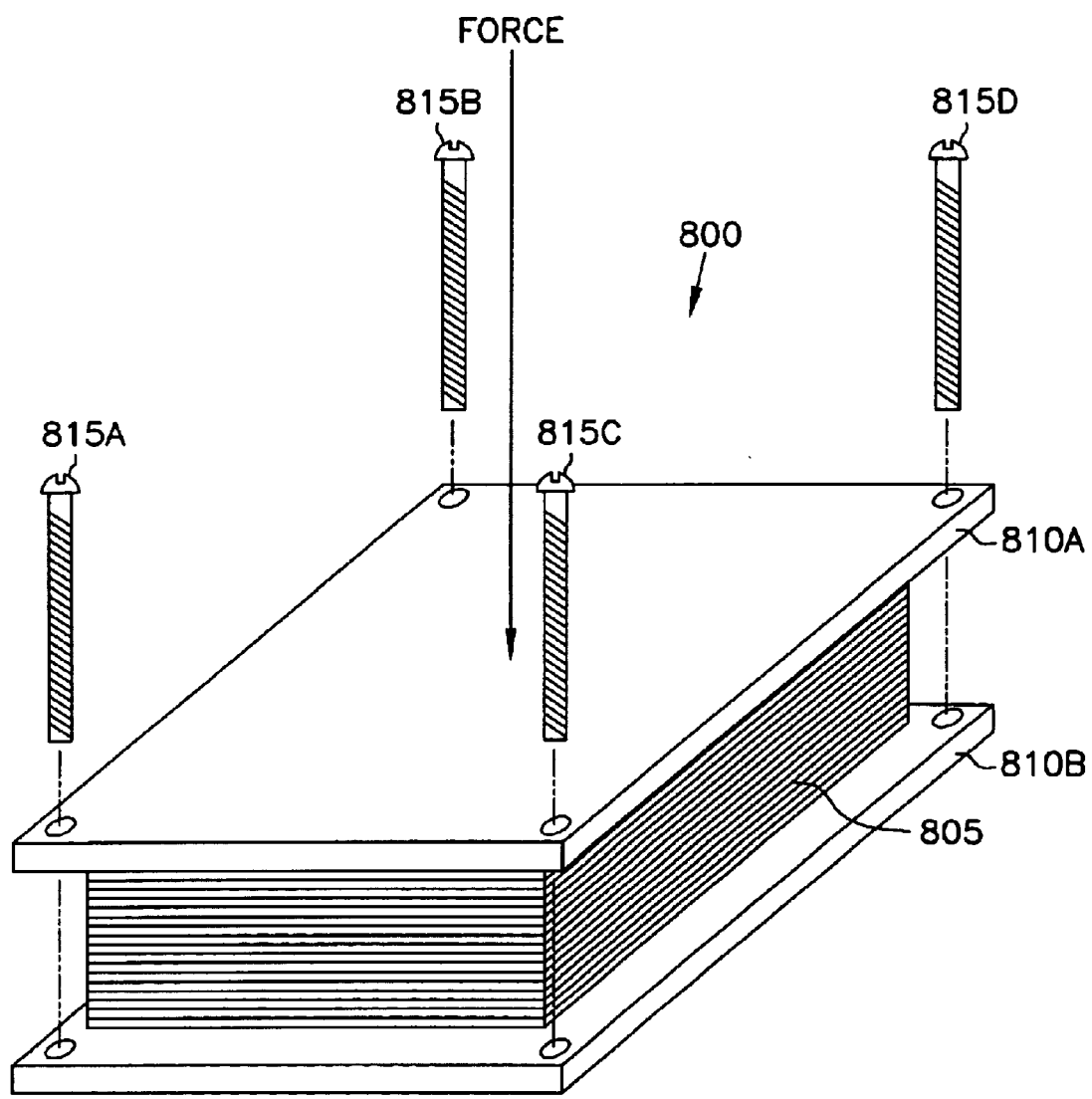
FIG. 8 is a schematic diagram that illustrates generally one embodiment of a planar capacitor.

FIG. 8 is a schematic diagram that illustrates generally, by way of example, but not by way of limitation, one embodiment of a planar capacitor 800. In one embodiment, capacitor 800 includes a multilayer capacitor element 805. Capacitor 800 also includes an apparatus for applying a compressive force to capacitor element 805. In one example, plates 810A-B are disposed on opposing sides of capacitor element 805. Openings in each of plates 810A-B receive threaded screws 815A-D. Screws 815A-D are tightened to obtain the compressive force applied to capacitor element 805. It is understood that FIG. 8 illustrates but one example of many available techniques included within the present invention for applying force to capacitor element 805. Many other techniques (e.g., encasing capacitor element 805) also obtain such a compressive force. In another example, simply placing capacitor element 805 in a tight container provides the compressive force to capacitor element 805.

Figure 9:
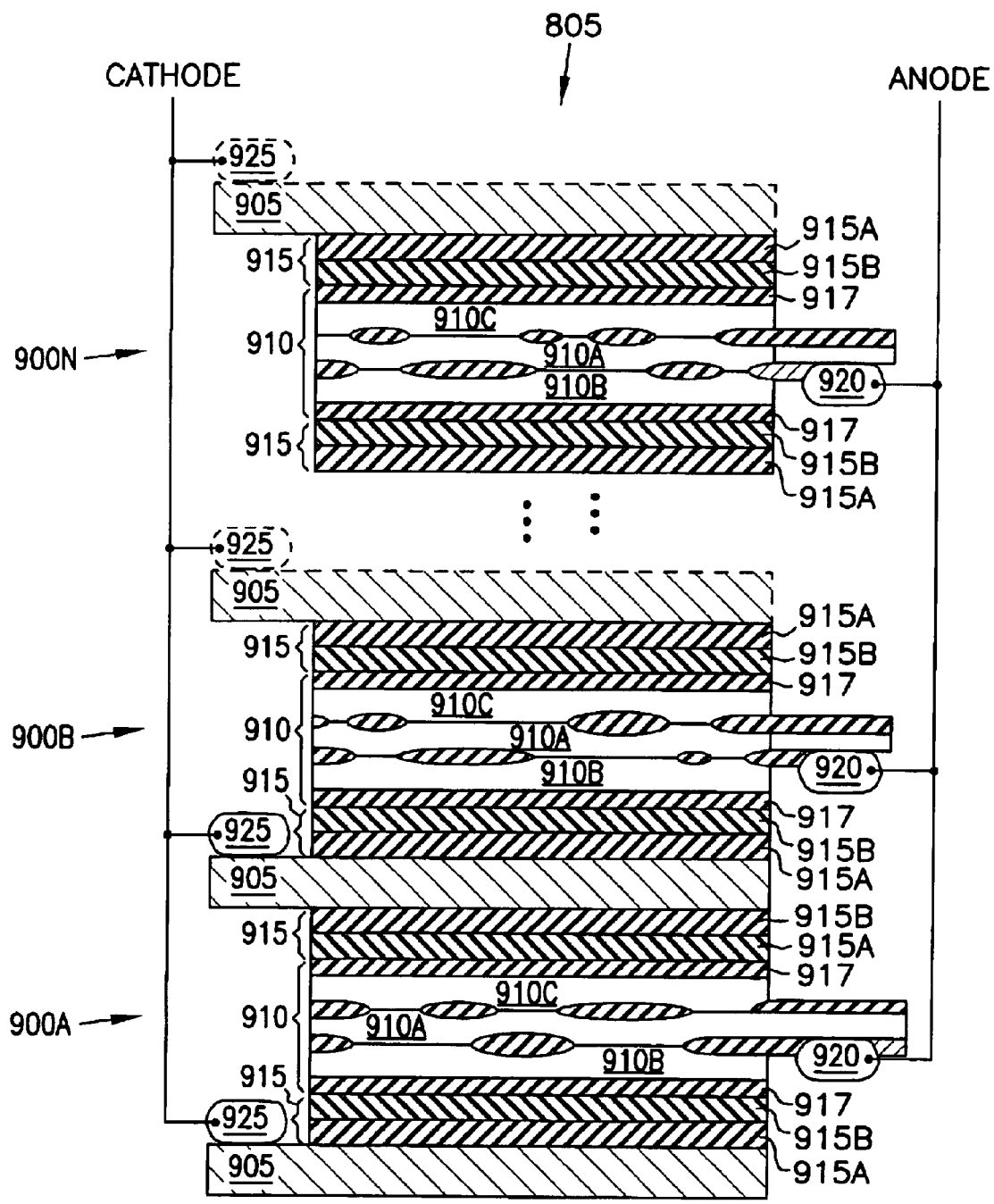
FIG. 9 is a schematic diagram that illustrates generally, by way of example, but not by way of limitation, one embodiment of a planar capacitor element.

FIG. 9 is a schematic diagram that illustrates generally, by way of example, but not by way of limitation, one embodiment of planar capacitor element 805. In one embodiment, capacitor element 805 includes a plurality of cells 900A, 900B, . . . , 900N, referred to generally as cells 900. Each of cells 900 includes a cathode 905, a multi-layer anode stack, 910, a separator 915 between a dielectric layer 917 each anode stack 910 and a corresponding substantially adjacent cathode 905, an anode tab 920, and a cathode tab 925. In the embodiment of FIG. 9, each separator 915 includes two pieces of liquid electrolyte permeable paper 915A-B, and each anode stack 910 includes a first anode 910A, a second anode 910B, and a third anode 910C.

In FIG. 9, each first anode 910 is joined to an anode tab 920, such as by cold welding, swaging, ultrasonic or spot welding, riveting, or any other suitable joining process. In one embodiment, second anode 910B and third anode 910C are each physically isolated from anode tab 920. Second anode 910B and third anode 910C are electrically coupled to anode tab 920 through first anode 910A. Each of second anode 910B and third anode 910C are in intimate physical and electrical contact with first anode 910A as a result of a compressive force.

In FIG. 9, the starting material for each first anode 910A, second anode 910B, and third anode 910C is oxidized on both surfaces by anodization, as discussed above. However, it is believed that the applied compressive force breaks through portions of the insulating surface oxide between first anode 910A and second anode 910B, and between first anode 910A and third anode 910C. This is believed to result in intimate physical and electrical contact between first anode 910A and each of second anode 910B and third anode 910C, as discussed above. The applied force should not be so great as to damage oxide dielectrics 917, which are also formed by anodization of the surfaces of the anode starting material. In one embodiment, separators 915 (e.g., comprising gauze fabric or kraft paper) are sufficiently yielding to protect against damage to oxide dielectrics 917 when the compressive force is applied.

Figure 10:
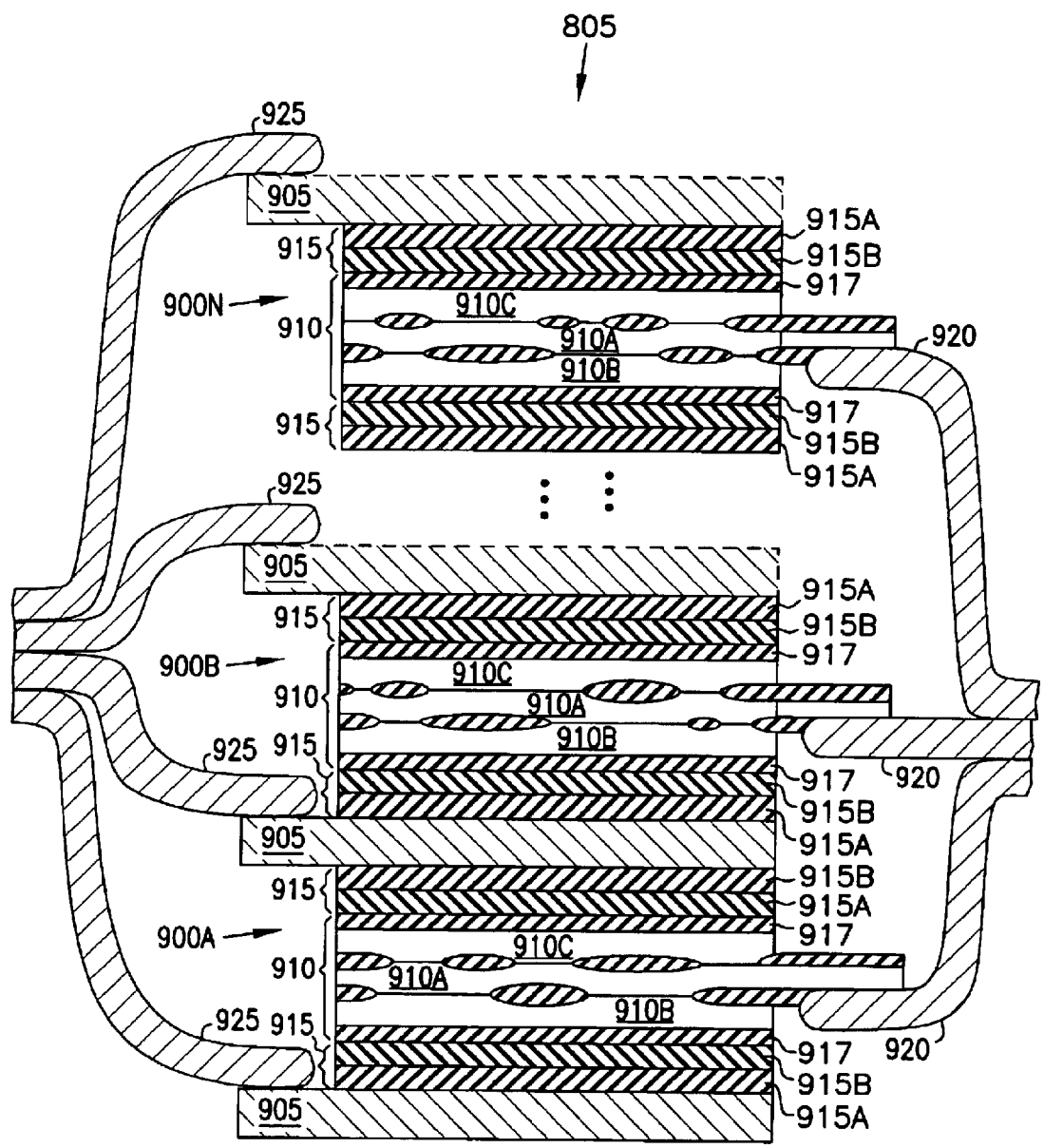
FIG. 10 is a schematic diagram that illustrates generally another embodiment of a planar capacitor element.

FIG. 10 is a schematic diagram that illustrates generally, by way of example, but not by way of limitation, another embodiment of planar capacitor element 805. In FIG. 10, anode tabs 920 are joined to first anodes 910, such as described above. Cathode tabs 925 are joined to cathodes 905, such as also described above. Anode tabs 920 are also joined together for providing an external anode connection. Similarly, cathode tabs 925 are joined together for providing an external cathode connection.

In the embodiments of FIGS. 9 and 10, each anode tab 920 need only be joined to a single anode (e.g., first anode 910A). This is advantageous because the tunnel-etched anodes are brittle, making the joining process difficult. Some anode materials may be so brittle that joining the anode tab 920 to an overhanging portion of the first anode, as illustrated in FIGS. 9 and 10, is very difficult. As an alternative, anode tab 920 is inserted into anode stack 910 as illustrated in FIG. 11.

Figure 11:
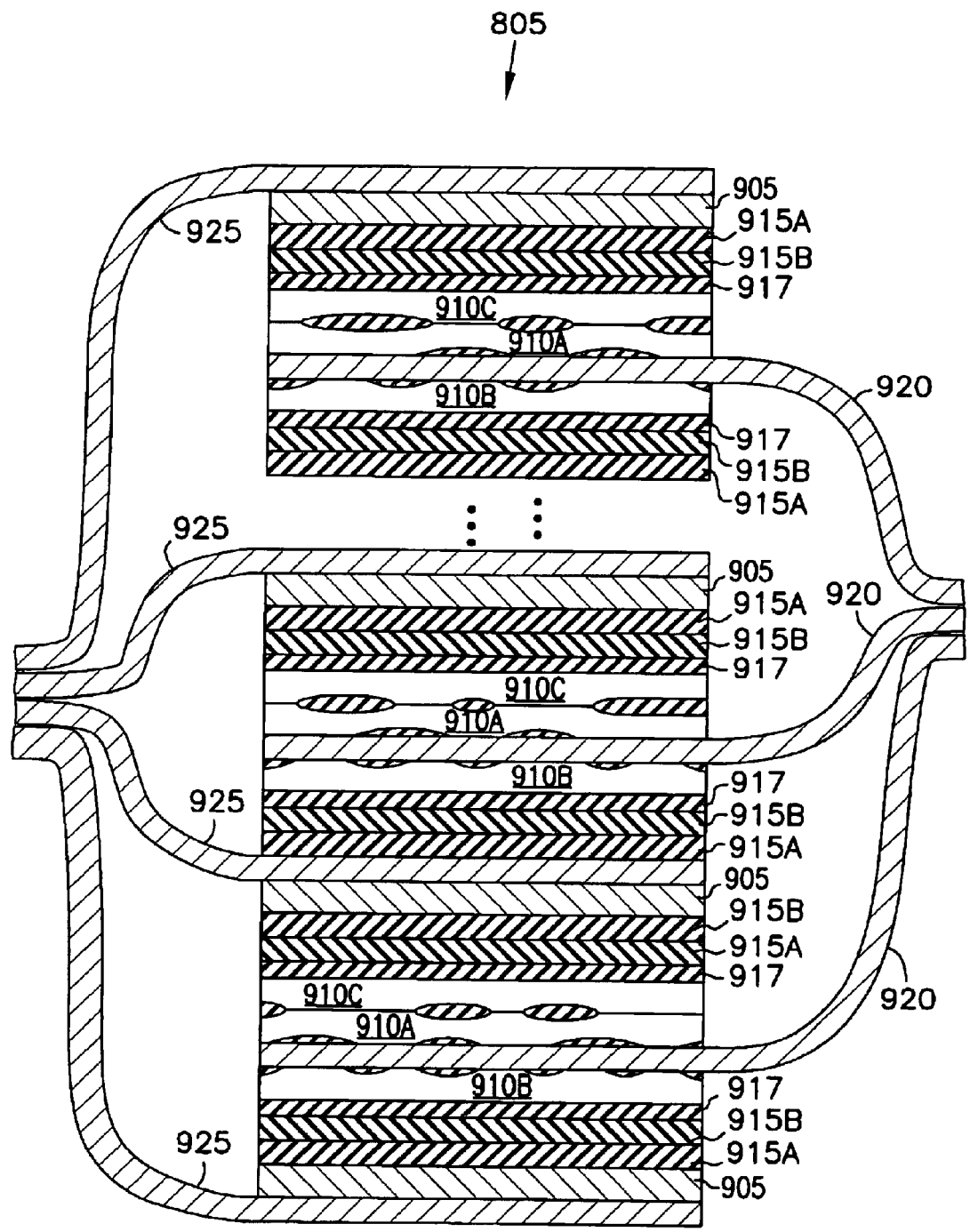
FIG. 11 is a schematic diagram that illustrates generally an embodiment of a planar capacitor element in which anode tabs and cathode tabs are inserted into the capacitor element.

FIG. 11 is a schematic diagram that illustrates generally, by way of example, but not by way of limitation, an embodiment of capacitor element 805 in which anode tabs 920 and cathode tabs 925 are inserted into the capacitor element 805. In one example, each anode tab 920 is inserted into an anode stack 910, and joined to first anode 910A, second anode 910B, or both, such as described above. Each cathode tab 925 is also inserted into capacitor element 805 and joined to a cathode 925. Each third anode 910C is physically isolated from the corresponding anode tab 920. Each third anode 910C is electrically coupled to anode tab 920 through first anode 910A. Intimate physical and electrical contact between third anode 910C and first anode 910A results from the applied compressive force, as described above, which breaks through portions of the intervening surface oxide, as described above.

Example Method of Forming Cylindrical Capacitor

Figure 12:
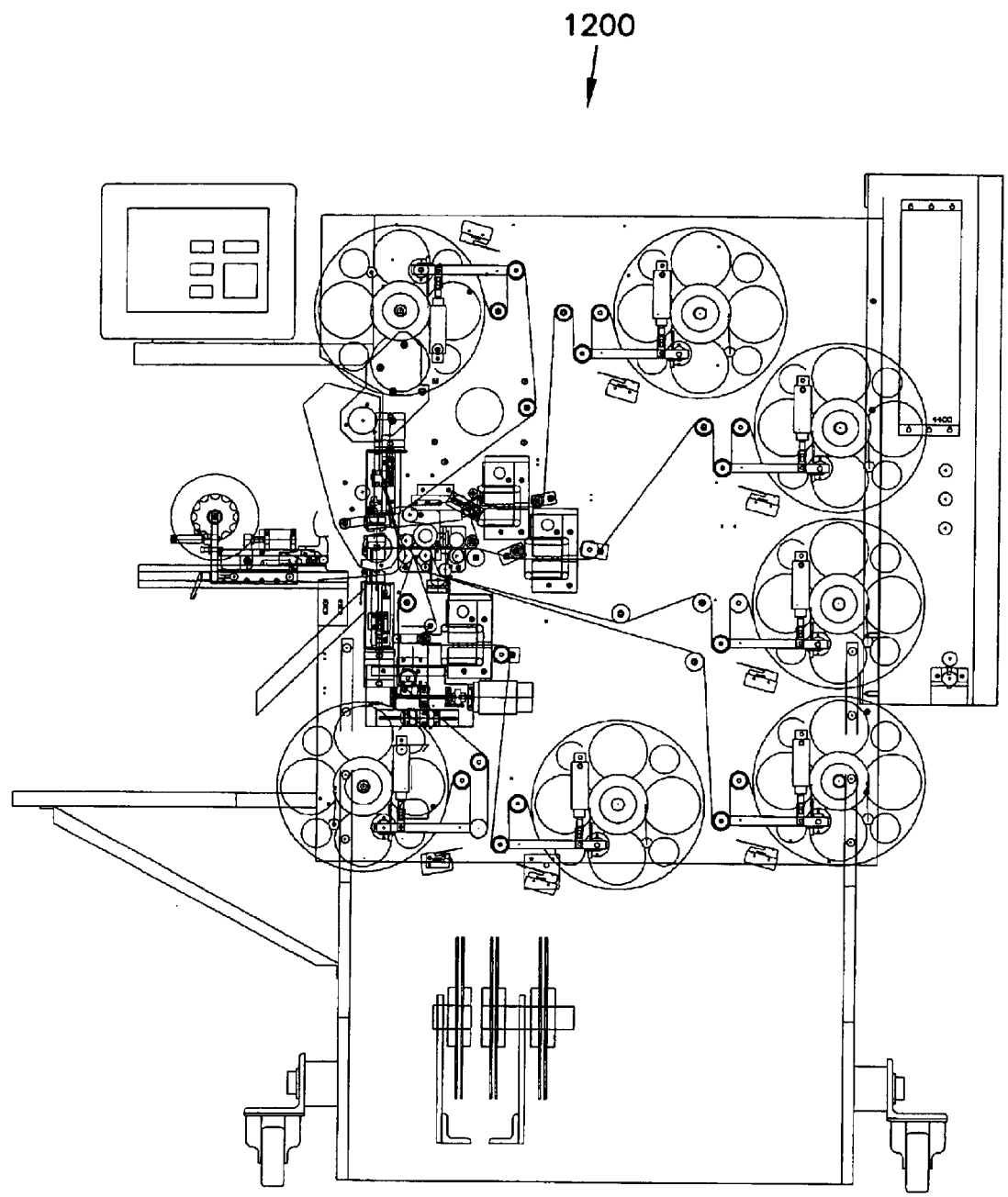
FIG. 12 is a schematic diagram that illustrates generally one embodiment of a capacitor winder apparatus.

FIGS. 2 through 7 illustrate various embodiments of portions of the present invention providing a cylindrical capacitor 140, as discussed above. In one example, the cylindrical capacitor 140 is formed by spiral winding using a capacitor winder apparatus. FIG. 12 is a schematic diagram that illustrates generally one example embodiment of such a capacitor winder 1200. In FIG. 12, capacitor winder 1200 is a Model 820 dual anode lug capacitor winder available from Micro Tech Manufacturing, Inc. of Worcester, Mass. As illustrated, the capacitor winder 1200 is capable of forming a cylindrical capacitor 140 having only 2 anodes in anode stack 215. In one embodiment of the present invention, an anode stack 215 having 2 anodes is provided. However, as discussed above, certain embodiments of the present invention utilize more than 2 anodes in anode stack 215. According to one technique of making one embodiment of the present invention, additional anode strips are trimmed to size, and the trimmed anode strips are manually inserted between the dual anode ribbons that are fed by reels on capacitor winder 1200. This provides an anode stack 215, which includes more than two anodes, in the resulting cylindrically wound capacitor 140. Alternatively, capacitor winder 1200 can be modified. Additional reels and feeders can be added to supply the additional anode ribbons for forming a capacitor 140 having an anode stack 215 that includes more than 2 anodes.

In one embodiment, by way of example, but not by way of limitation, the anode stack 215 includes 3 anode layers 215A-C (as illustrated in FIG. 4). Each one of anode layers 215A-C formed of a tunnel-etched oxidized aluminum foil ribbon having a width of approximately 24 millimeters and a thickness of approximately 0.0041 inches. The cathode 220 is formed from an aluminum foil ribbon having a width of approximately 24 millimeters and a thickness of approximately 0.0012 inches. Each separator 225A and 225B includes two layers of a paper ribbon, each having a width of 27 millimeters and a thickness of approximately between 12.7 and 20 microns. Anode stack 215, cathode 220, and paper separators 225A-B are cut to a desired length to obtain a particular capacitance value of capacitor 140. In one embodiment, the wound capacitor 140 has a cylindrical diameter of approximately 14.5 millimeters, and is held together (i.e., prevented from unwinding) by wrapping in an adhesive tape having a width of approximately 26.6 microns and a thickness of approximately 53 microns.

As described above, it is believed that compressive force (e.g., as a result of the cylindrical winding) results in intimate physical and electrical contact between anodes in anode stack 215, such that anode tab 205 need only be joined to a single anode in anode stack 215 for obtaining an electrical connection to other anodes in anode stack 215. For the above-described example, one embodiment of settings used on the Model 820 dual anode lug capacitor winder to obtain intimate physical and electrical contact between first anode 215A and second anode 215B as a result of compressive force is illustrated, by way of example, but not by way of limitation, in Table 1. While the settings set forth in Table 1 will enable one skilled in the art to make and use certain embodiments of the invention, it is understood that other settings may also be used.

TABLE 1

Exemplary settings for Model 820 Capacitor Winder

| Parameter | Setting |
| --- | --- |
| Paper Tension | 6.0 |
| Anode Tension | 1.5 |
| Cathode Tension | 4.5 |

CONCLUSION

Thus, the present invention provides, among other things, a multi-anodic electrolytic capacitor and electrical connection to the multiple anodes in an anode stack using a single anode tab that is attached only to a first anode. Other anodes are electrically coupled to the anode tab through the first anode. Anodes in the anode stack are in intimate physical and electrical contact with other such anodes.

The present invention reduces capacitor volume, increases capacitor reliability, and reduces the cost and complexity of the capacitor manufacturing process for multi-anodic capacitors. The present invention is capable of use in implantable defibrillators, camera photoflashes, and other electric circuit applications.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method forming an anode stack for a cylindrical capacitor, the method comprising:

providing two or more conductive ribbons, each having an insulative coating; and winding portions of the conductive ribbons around an axis with sufficient force to establish electrical contact of two or more of the conductive ribbons through their respective insulative coatings.

2. The method of claim 1, wherein each insulative coatings consists essentially of an oxide.

3. The method claim 1, wherein no more than one of every two conductive ribbons is joined to an anode tab.

4. The method of claim 3, wherein the anode tab is oriented transverse to a length dimension of each ribbon.

5. The method of claim 1, wherein no more than one of every three conductive ribbons is joined to an anode tab.

6. The method of claim 1, wherein the at least two of the conductive ribbons in electrical contact through their respective insulative coatings are arranged such that one of the two ribbons has a major surface overlying and contacting a major surface of the other of the two ribbons.

7. A method forming an anode stark for a cylindrical capacitor, the method comprising:

providing two or more conductive ribbons, each having an insulative coating; and winding portions of the conductive ribbons around an axis with sufficient force to establish electrical contact of two or more of the conductive ribbons through their respective insulative coatings, wherein portions of the conductive ribbons around an axis with sufficient force to establish electrical contact of two or more of the conductive ribbons through their respective insulative coatings comprises:

providing a dual anode lug capacitor winder; and operating the winder at a tension setting of 1.5 for at least two of the conductive ribbons.

8. The method of claim 7, wherein the at least two of the conductive ribbons in electrical contact through their respective insulative coatings are arranged such that one of the two ribbons has a major surface overlying and contacting a major surface of the other of the two ribbons.

* * * * *

UNITED STATES PATENT AND TRADEMARK OFFICE
CERTIFICATE OF CORRECTION

PATENT NO. : 6,881,232 B2 Page 1 of 1
APPLICATION NO. : 10/617279
DATED : April 19, 2005
INVENTOR(S) : O'Phelan et al.

It is certified that error appears in the above-identified patent and that said Letters Patent is hereby corrected as shown below:

In column 12, line 24, in Claim 3, after "method" insert -- of --.

In column 12, line 35, in Claim 7, delete "stark" and insert -- stack --, therefor.

In column 12, line 42, in Claim 7, after "wherein" insert -- winding --, therefor.

Signed and Sealed this

Thirteenth Day of March, 2007

JON W. DUDAS
*Director of the United States Patent and Trademark Office*